D. STERNBERG.
Flavoring-Compound for Tobacco.
No. 212,331.  Patented Feb. 18, 1879.
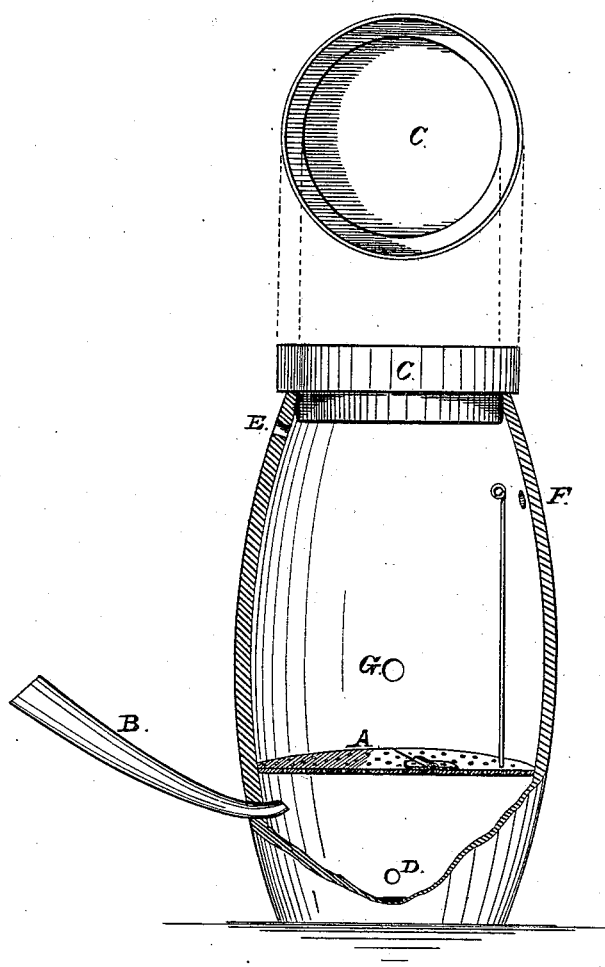

UNITED STATES PATENT OFFICE.

DAVID STERNBERG, OF SAN FRANCISCO, CALIFORNIA.

IMPROVEMENT IN FLAVORING COMPOUNDS FOR TOBACCO.

Specification forming part of Letters Patent No. 212,331, dated February 18, 1879; application filed November 7, 1878.

*To all whom it may concern:*

Be it known that I, DAVID STERNBERG, of the city and county of San Francisco, in the State of California, have invented a certain new and useful compound and a process of preparing or manufacturing the same, which compound is known as a "Flavoring Extract for Tobacco," and is fully described in the following specification.

This invention relates to that class of products or compounds used in the manufacture and preparation of tobacco to impart to it a desired artificial flavor; and it consists in the production of an extract from the following-named ingredients by means of the process and apparatus and according to the formula herein described and given.

To prepare this extract I first provide a digester consisting of a tank, cask, or vessel of suitable capacity provided with a perforated removable diaphragm, A, placed at about two feet from the bottom just above the inlet of the steam-pipe B. The top of this digester is closed and covered with a metal pan or vessel, C, having a recessed bottom that fits tightly within and down into the top of the digester. Through the sides of the digester, at different heights, are provided orifices D E F G, closed by plugs or cocks, for pouring in and drawing off the liquids.

In connection with this apparatus I employ two kettles, one of double the capacity of the other, for boiling and reducing the ingredients.

The first step in the process consists in preparing a concentrated solution of valerian, which I obtain in the following manner: Into the smaller kettle or vessel I put one-half pound of valerian-root and one gallon of rum and seal it hermetically. This vessel I then place in the larger vessel, having in it four gallons of water, and submit it to the action of a fire until one-half of the water is boiled away. I then remove the smaller vessel and keep it in a cool place for eighteen hours, and afterward repeat the boiling, the larger vessel being filled up this time with four gallons of water, as before, and with an additional gallon added, and then submitted to the boiling operation until the water is reduced to one gallon. After this I pour into the vessel containing the valerian two quarts of alcohol at 95°, and then seal it up again and repeat the operation of boiling and cooling. I then prepare and mix together the following ingredients: Cassia-fistula, three pounds; tonka-bean, one pound; Peruvian balsam, eight ounces; orange-blossom oil, four ounces; essence valerian, one pound; butyric ether, two ounces; orange-blossoms, four ounces; orange-peel, two and one-half pounds; tamarinds, three pounds, or dried prunes, six pounds; vanilla-bean, four ounces; castoreum, two ounces. These are divided into small pieces, and the whole mixed together and placed on a linen cloth, which is then laid upon the top of the perforated diaphragm in the digester.

This vessel is to be from one hundred and fifty to two hundred gallons capacity, and the four holes in the sides are placed, respectively—D, at two inches from the bottom; E, eight inches from the top; F, sixteen inches from the top; G, twenty inches from the top. These are all closed with plugs or cocks.

The vessel or digester having the cloth with the several ingredients therein is now closed up steam-tight, and the metal pan on the top is filled with cold water. Wet steam at eight pounds pressure is admitted through the pipe B for the space of fifteen hours and then shut off. One quart of the concentrated solution, first prepared in the small vessel, is then poured into the digester through the inlet E, and after this opening is closed the steam is again admitted, under a pressure of fifteen pounds, until the water in the pan C is caused to boil. The digester is then kept in this condition for one hour and twenty minutes, when the steam is shut off. The opening F is then opened, and through it are poured two and one-half quarts of the concentrated solution first prepared, and after the opening is closed again the steam is readmitted under a pressure of eight pounds and continued for two hours. At the end of this time I introduce into the digester, through the hole E, five (5) vanilla-beans, and suspend them within it by securing them to the end of a cord or string, the end of which is allowed to remain outside. The digester is then closed again, and steam, at a pressure of from eight to ten pounds, is again admitted into the digester and continued for five hours. The quantity of water in the metal pan will be then reduced one-third.

I now take the remainder of the valerian solution in the smaller vessel, and after straining it through a cloth I put it into the metal pan on the top of the digester and cover it as tightly as possible, and then admit steam beneath it into the digester at eight to ten pounds pressure. To the contents of this metal pan I then add one gallon of rum and one-half gallon of alcohol, and after shutting off the steam I let it stand until it becomes cold. This product in the metal pan C is next put into the digester and the pan filled up with clear water. The steam is then readmitted under fifteen pounds pressure, and is continued for fifteen hours. The product in the digester thus obtained will be from twenty-five to thirty gallons of flavoring-extract.

The metal pan C covering the top of the digester is filled with water, as described, for the purpose of aiding in condensing the steam admitted into the digester, and the water in it, when boiled down, is used to mix with the other ingredients in the digester.

In applying this product or compound to the flavoring of tobacco, I first place the tobacco in the empty digester, and after closing all openings I turn on the steam and subject it to this process until, upon opening the hole D, the water will run almost clear from the digester. At this point I shut off the steam and then remove the tobacco and dip it into the flavoring extract or liquid, and afterward allow it to dry for use.

Having thus fully described my invention, and the mode of preparing, applying, and using the same, what I claim, and desire to secure by Letters Patent, is—

A flavoring extract or liquid for treating tobacco, consisting of a solution of valerian-root and the following ingredients: Cassia-fistula, tonka-bean, Peruvian balsam, orange-blossom oil, essence valerian, butyric ether, orange-blossoms, orange-peel, tamarinds or prunes, vanilla-bean, and castor, combined in about the proportions and after the manner herein set forth.

In testimony that I claim the foregoing I have hereunto set my hand and seal this 26th day of September, 1878.

DAVID STERNBERG. [L. S.]

Witnesses:
  C. W. M. SMITH,
  PHILIP MAHLER.